United States Patent [19]

Nishida et al.

[11] Patent Number: 5,029,067
[45] Date of Patent: Jul. 2, 1991

[54] OPERATION CONTROL DEVICE

[75] Inventors: Kimio Nishida, Hirakata; Toshio Yokoyama, Uji; Yukio Moriya; Takeshi Kobayashi, both of Hirakata, all of Japan

[73] Assignee: Kabushiki Kaisha Komatsu Seisakusho, Tokyo, Japan

[21] Appl. No.: 269,834
[22] PCT Filed: Dec. 8, 1987
[86] PCT No.: PCT/JP87/00952
§ 371 Date: Nov. 22, 1988
§ 102(e) Date: Nov. 22, 1988
[87] PCT Pub. No.: WO88/05937
PCT Pub. Date: Aug. 11, 1988

[30] Foreign Application Priority Data

Jan. 30, 1987 [JP] Japan .................................. 62-19769
Jan. 30, 1987 [JP] Japan .................................. 62-19770

[51] Int. Cl.⁵ ...................... F16D 31/02; G05B 11/32
[52] U.S. Cl. ....................................... 364/175; 60/421
[58] Field of Search ............... 364/137, 138, 141, 142, 364/143, 146, 167.01, 172, 173, 175, 176, 180, 190, 478, 513; 60/421, 433, 327

[56] References Cited

U.S. PATENT DOCUMENTS

| 3,908,375 | 9/1975 | Young | 60/422 |
| 4,369,625 | 1/1983 | Izumi et al. | 60/327 |
| 4,561,249 | 12/1985 | Watanabe et al. | 60/421 |
| 4,604,174 | 8/1986 | Kato et al. | 364/174 |
| 4,745,744 | 5/1988 | Cherry et al. | 364/513 |
| 4,791,549 | 12/1988 | Heiser et al. | 364/180 |
| 4,837,734 | 6/1989 | Ichikawa et al. | 364/190 |

FOREIGN PATENT DOCUMENTS 0071228 9/1983 European Pat. Off. .
52-97088 8/1977 Japan .

Primary Examiner—Jerry Smith
Assistant Examiner—Jim Trammell
Attorney, Agent, or Firm—Diller, Ramik & Wight

[57] ABSTRACT

An operation control device is disclosed. According to a drive command value generated depending on the manipulated amount of a plurality of operating means (11, 12, 13, 14, 15, 16), the operation control device controls the drive amount of actuators (BMS, AMS, BKS, LDM, RDM, TNM) associated with the operated actuator. In the drive amount control, the operation control device changes a ratio of the manipulated amount and the drive amount command value by work accuracy flow rate data (41), weights the drive command values based on the same manipulated values of said operating means by priority mode weight data (42), and/or controls the timing of supply of the drive energy from at least two separate energy sources (FFP, RP) as a drive energy source for the respective actuators, and the supply amount of the drive energy, under control of pump utilization data (43) and pump swash plate control data (44). Every time the operating means are operated, these pieces of the control data are properly determined through proper operations (including the look-up table processing) according to the operations of the operating means, the selections of the work accuracy mode select switch (21) and the priority mode select switch (22).

2 Claims, 9 Drawing Sheets

| OPERATION PATTERN / PUMP | FRONT PUMP | REAR PUMP |
|---|---|---|
| 1 ARM+REVOLUTION | ARM | REVOLUTION |
| 2 BOOM+REVOLUTION | BOOM | REVOLUTION |
| 3 BOOM+BUCKET | BOOM | BUCKET |
| 4 BUCKET | BUCKET | |
| 5 BOOM+ARM+BUCKET | BOOM, BUCKET | ARM |
| 6 BOOM+ARM+REVOLUTION | BOOM | ARM, REVOLUTION |
| 7 BOOM+ARM+REVOLUTION+BUCKET | BOOM, BUCKET | ARM, REVOLUTION |
| 8 TRAVELLING+BOOM+REVOLUTION | TRAVELLING | BOOM, REVOLUTION |
| 9 TRAVELLING+BOOM | TRAVELLING | BOOM |
| 10 TRAVELLING+BOOM+ARM+REVOLUTION+BUCKET | TRAVELLING, BOOM | BUCKET, ARM, REVOLUTION |

FIG.13

OPERATION CONTROL DEVICE

TECHNICAL FIELD

The present invention relates to an operation control device for controlling the drive elements of various types of working tools in use with a construction machine such as a power shovel, through the operation of different levers, for example.

BACKGROUND ART

As an exemplar of this type of operation control device, one may enumerate an operation control device for a hydraulic power shovel.

As well known, this type of power shovel is equipped with hydraulic cylinders as actuators, hydraulic motors, and operating levers. The hydraulic cylinders respectively provide necessary drive forces for working tools such as booms, arms and buckets. The hydraulic motors generate necessary drive forces for a traveling system and a revolving system of the power shovel. The operating levers, provided in association with the hydraulic actuators, are collectively installed in a cabin. For a specific operation of a working tool, an operator properly operates the operating levers with a required direction and a required stroke. The direction and stroke determine a drive direction and a drive amount of the related actuators, viz., an influx direction and a flow rate of the pressure oil (the control system is generally called a pilot operate system).

When operating the power shovel, an operator frequently uses a called multi-operation (to simultaneously supply pressure oil to a plurality of actuators in order to simultaneously drive different actuators, such as the combination of a boom and an arm, and the combination of an arm and a bucket, by simultaneously operating the corresponding operating levers. When the above operating control device is operated for effecting the multi-operation, the priority order for pressure oil to flow into the intended actuators depends on the current pressures in the load circuits connecting to the actuators. The flow rate of the pressure oil to each actuator depends on a stroke of the related lever by an operator.

Let us consider a case that the multi-operation is for the combination of a boom and an arm, and the boom must be operated earlier than the arm. In this case, if the boom load is lighter than the arm load at a time point, the pressure oil first enters the actuator associated with the boom. Therefore, this multi-operation is relatively easy. Reversely, if the boom load is heavier than the arm load, the pressure oil first enters the actuator associated with the arm. This makes the multi-operation complicated and difficult. In this case, to effect an intended work, an operator must actively operate the operating levers, generally two, associated with the boom and the arm, while adjusting the strokes. This lever operation requires highly skilled operators. Unskilled operators, if engaged upon such a multi-operation, consume much time and increase the cost for the working. The working finish is most frequently imperfect and unsatisfactory.

The above problems of the operations, particularly the multi-operation, also exist in any other operation control device not based on the pressure oil in which a plurality of actuators respectively associated with operating means such as levers are provided, and the drive amounts of the actuators are controlled by the strokes of the corresponding operating means, respectively.

Also in those other operation control devices, the operation of the operating means is considerably complicated and difficult. A high-degree skill is required for intentionally controlling different actuators for the intended operations.

For the above background reasons, an object of the present invention is to improve the operability of this type of the operation control device, and to enable any operator including skilled and unskilled operators to exactly control the actuators in any operating mode including the multi-operation.

DISCLOSURE OF INVENTION

For controlling the drive amounts of actuators provided in association with operating means according to drive command values as generated depending on the manipulated amounts of the operating means, weighting means is provided for individually weighting the drive command values based on the same manipulated amounts of the operating means, and for transferring the weighted drive command values respectively to the actuators.

With provision of the weighting means, the drive command values are weighted on the basis of the details of the currently operated operating means. The actuators associated with the operating means are operated in priority orders, or weighted orders. Therefore, even in the operation mode of the operating means in which a plurality of operating means are simultaneously operated, such as the multi-operation mode, the actuators associated with the operated operating means are driven in an ideal order, or the priority order, through a mere natural operation of the operating means by an operator.

The operation control device further comprises at least two drive energy sources for variably supplying drive energy to the actuators, and separation control means for separately controlling the timing of the supplies of the drive energy from said drive energy source to said actuators, and further the amount of the supplied energy, by arranging the energy supplies in a priority order on the basis of the combinations of the simultaneously driven actuators.

Further provision of those components has successfully eliminated the competitive energy reception occurring among a plurality of simultaneously operated operating means. Therefore, the drive energy may be fed to all the actuators smoothly and optimally according to the drive command values.

BRIEF DESCRIPTION OF THE DRAWINGS

FIGS. 9a–9c show characteristic curves defining the swash plate command values of pumps vs. flow rate command values, as stored in the fourth memory;

FIGS. 10a–10c show schematic diagrams for showing the structures of pressure oil flow rate control valves used in the embodiment;

FIG. 13 shows a table showing proportional distributions of pressure oil to the actuators when the embodiment is operated in a multi-operation mode.

THE BEST MODE FOR EMBODYING THE INVENTION

An embodiment of an operation control device according to the present invention is illustrated in FIGS. 1 through 13.

Figure 1:
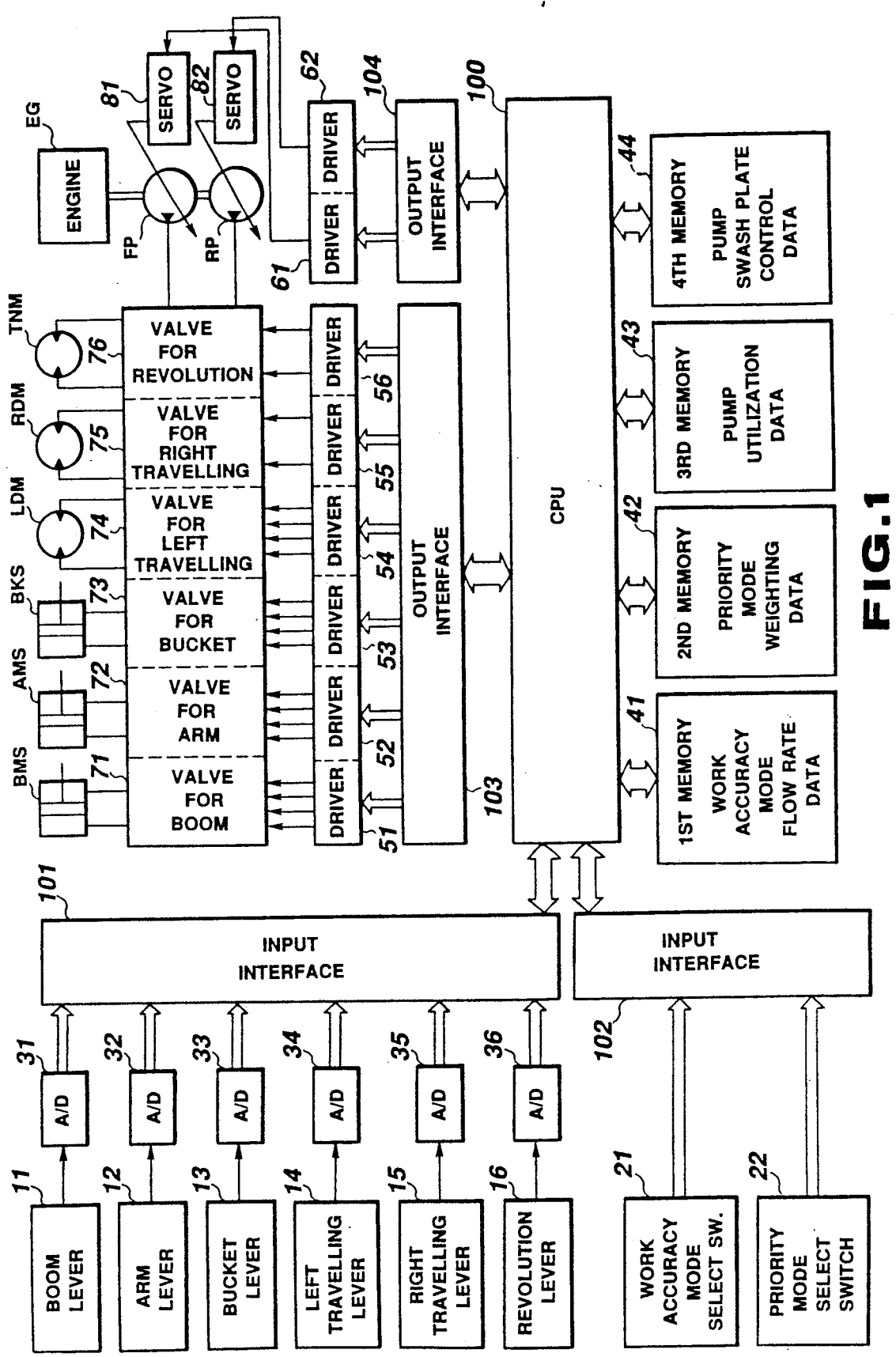
FIG. 1 shows a block diagram showing an arrangement of an embodiment of an operation control device according to the present invention.
Figure 11:
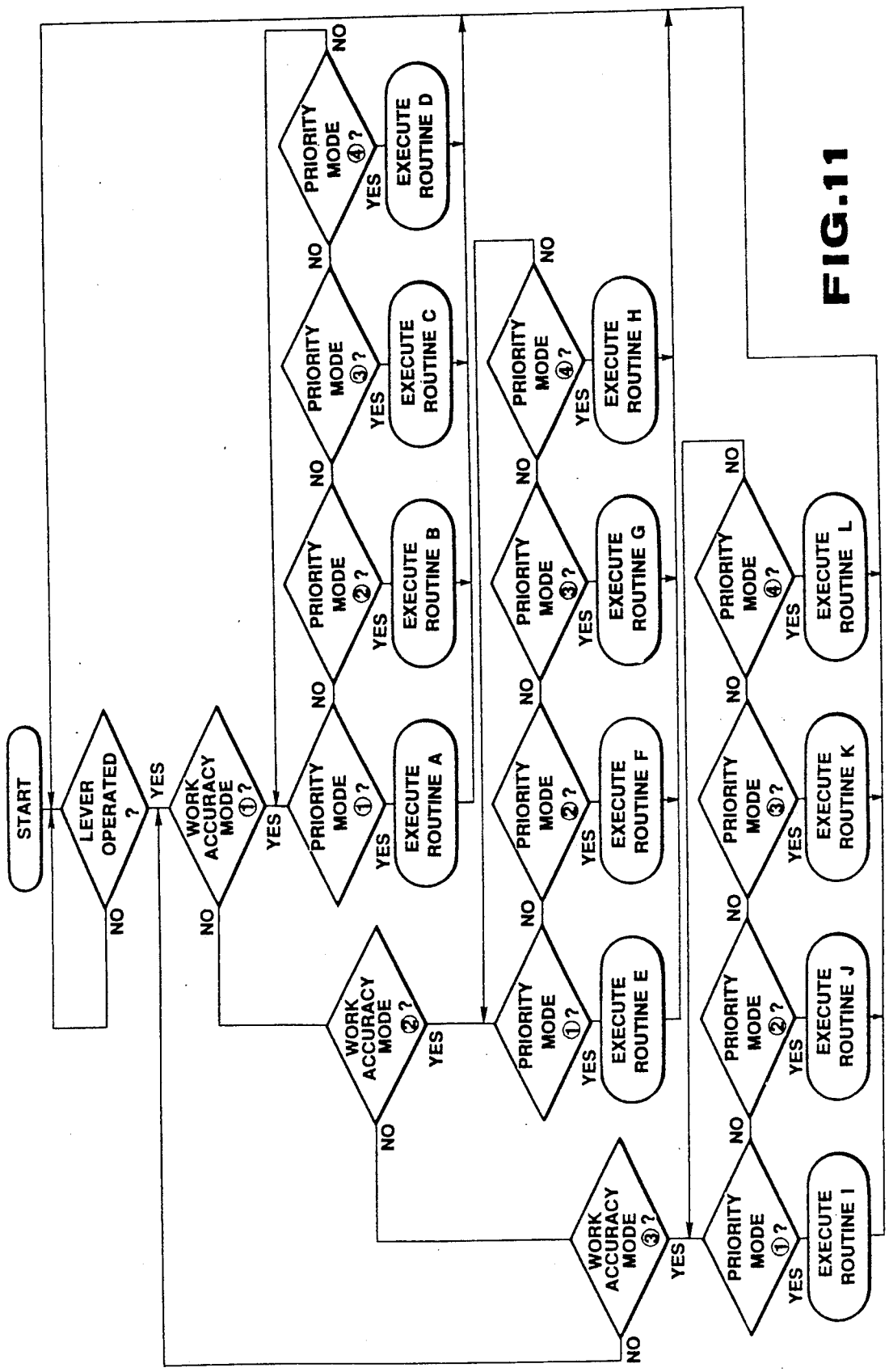
FIGS. 11 and 12 show flow charts showing control flows by a CPU in the embodiment.
Figure 12:
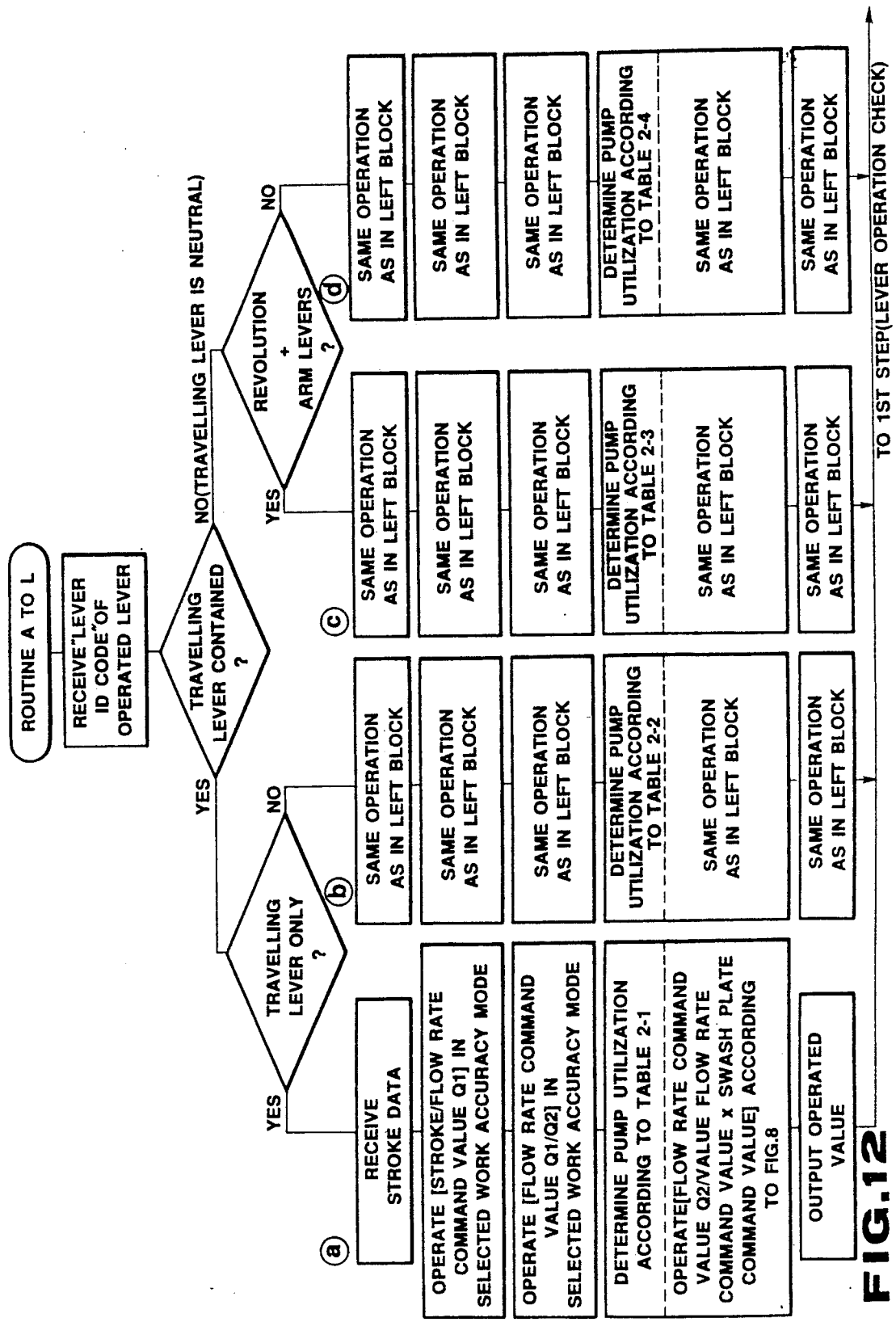

In the embodiment, the present invention is incorporated into the operation control device in use with the hydraulic power shovel. FIG. 1 shows an overall arrangement of the operation control device according to the embodiment. FIGS. 2 through 10 illustrate the detailed arrangement and functions of the key sections in the operation control device. FIGS. 11 and 12 show the detailed control flows of a CPU shown in FIG. 1 illustrating the operation control device. FIG. 13 shows a table showing a distribution of the flows of the pressure oil into the respective actuators (hydraulic cylinders or hydraulic motors) when the multi-operation is performed in the operation control device.

The arrangements and the functions of the key sections of the operation control device according to the present invention will be described referring to FIGS. 1, and 2 through 10.

In FIG. 1 showing the operation control device, BMS, AMS, BKS, LDM, RDM and TNM show the actuators of the power shovel. BMS represents a hydraulic cylinder for boom (referred to as a boom cylinder). AMS a hydraulic cylinder for an arm (referred to as an arm cylinder). BKS a hydraulic cylinder for a bucket (referred to as a bucket cylinder). LDM a left drive hydraulic motor (referred to as a left drive or travelling motor). RDM a right drive hydraulic motor (referred to as a right drive or travelling motor). TNM a turning hydraulic motor (referred to as a turning motor). As will be seen from FIG. 2, the boom cylinder BMS vertically swings a boom BM through its reciprocating motion. The arm cylinder AMS controls the digging and dumping work by an arm AM, through its reciprocating motion. The bucket cylinder reciprocately operates to control the digging and dumping work with a bucket BK. The left drive motor LDM drive traversal travelling systems in the power shovel through the forward and reverse rotations. The turning motor drives the power shovel to turn, through the forward and reverse rotations. The details of the hydraulic control of these cylinders and motors will be described later referring to FIG. 10.

In FIG. 1, a boom lever 11, arm lever 12, bucket lever 13, and left drive lever 14, right drive lever 15, and turning lever 16 are respectively provided in association with the boom cylinder BMS, arm cylinder AMS, bucket cylinder BKS, left drive motor LDM, right drive motor RDM, and turning motor TNM. These levers are operating levers for entering a drive direction and a drive amount, viz., an influx direction and a flow rate of the pressure oil to these cylinders and motors which will subsequently be described, through the operation of levers by an operator.

Figure 2:
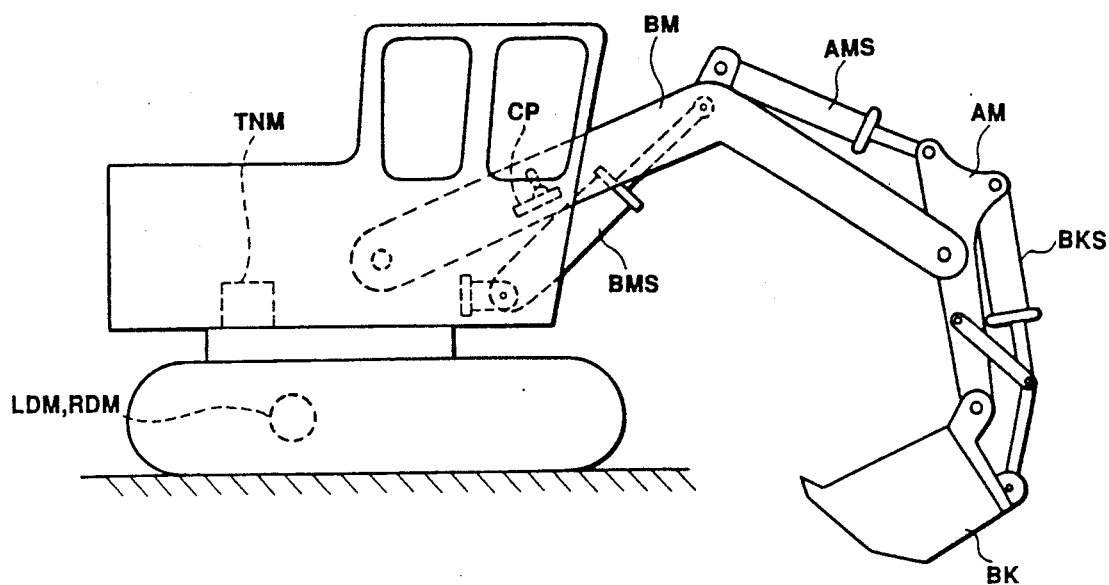
FIG. 2 shows a side view of a hydraulic power shovel to which the present embodiment is applied.
Figure 3:
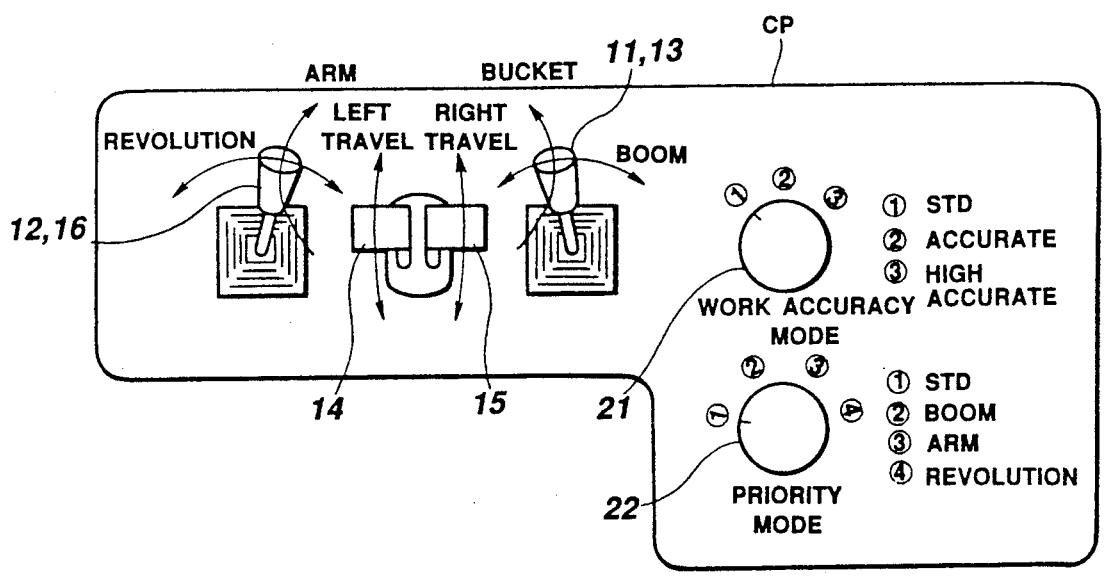
FIG. 3 shows a plan view of an operation or cabin panel used in the embodiment.

These levers 11 to 16 are collectively installed on a control panel CP in a power shovel cabin shown in FIG. 2. The layout and functions of these levers are as shown in FIG. 3. In this instance, a single operating lever is used for both the boom lever 11 and the bucket lever 13, as shown in FIG. 3. To use this lever as the boom lever 11, the lever is operated in a horizontal direction. When the lever is vertically operated, it serves as the bucket lever 13. Further, when it is obliquely operated, the multi-operation is performed to operate the boom BM and the bucket BK depending on the vertical and horizontal components of the oblique motion of the lever (see FIG. 2). The same thing is true for a lever serving as both the arm lever 12 and the turning lever 16. Different operating levers are provided used exclusively used for the left drive lever 14 and the right drive lever 15, respectively. The vertical operation of these operating levers provide the horizontal drive forces for the horizontal travelling systems of the power shovel, respectively. The horizontal drive levers 14 and 15 are arranged closely to such an extent as to allow the single-handed operation by an operator.

Although the levers 11 to 16 are illustrated as mere blocks in FIG. 1, the innards of the lever blocks contain potentiometers, for example. When an operator operates these levers, the potentiometers each generate a DC voltage representing a manipulated amount of the lever, i.e., lever stroke, This type of the lever (generally called an electric lever) is well known and is not essential to the present invention. No further description of it will given.

A work mode select switch 21 shown in FIG. 1 is used for selecting accuracies of the operation to be done by the power shovel in several steps. This is manually operated by an operator. A priority mode select switch 22 also in FIG. 1, manually operated by an operator, is used in the multi-operation. In the multi-operation, the operator decides which tool of those including the boom, arm and bucket, and the revolving system is to be operated first or at the highest priority, and turns the switch 22 to the related position.

These mode select switches 21 and 22 are closely laid out on the control panel CP in the cabin in connection with the selected mode items, as shown in FIG. 3. To be more specific, the work mode select switch 21 has the following three modes with different operation accuracies. An operator may select any desired one of those modes.

(1) STD (standard mode)

This mode is used for relatively rough works such as normal digging, loading, and normal work.

(2) Accurate mode

This mode is used for the work requiring an accuracy to some degree, such as the finishing work of ground leveling.

(3) Highly accurate mode

This mode is used for the work requiring a high accuracy, such as lift work. The priority mode select switch 22 has the following four modes any of which an operator may select.

(1) STD (standard) mode

In a normal multi-operation of the power shovel, normal priority of the pressure oil supply is set up for the work tools, revolving system and traveling system.

(2) Boom priority mode

This mode is used in a special multi-operation to first operate the boom BM (FIG. 2). In the mode, the priorities of the pressure oil supply to the work tools, revolving system and travelling systems are set up with the boom at the top priority.

(3) Arm priority mode

This mode is used in yet another special multi-operation to first operate the boom AM (FIG. 2). In the mode, the priorities of the pressure oil supply to the work tools, revolving system and travelling systems are set up with the arm at the top priority.

(4) Revolving priority mode

This mode is used in a further special multi-operation to first operate the revolving system (FIG. 2). In the mode, the priorities of the pressure oil supply to the work tools, revolving system and travelling systems are set up with the revolving system at the top priority. The work mode select switch 21 is used to change, according to a selected work accuracy mode, a ratio of the manipulated amount (stroke) of each operating lever 11 to 16 and a value of a flow rate command for specifying a flow rate of the pressure oil supplied to each actuator, which is determined by the stroke of each lever. The priority mode select switch 22 is used for weighting, according to the selected priority mode, the respective flow rate command values whose rate to the strokes were changed depending on the same manipulated amounts of the levers 11 to 16 and by the work accuracy mode select switch 21. The detailed description of these will be given in connection with first and second memories 41 and 42.

Referring again to FIG. 1, A/D (analog to digital) converters 31 to 36 are provided respectively connecting to the operating levers 11 to 16. These A/D converters convert the lever stroke analog data, which are derived in the form of DC voltage from the levers, into digital data consisting of a set of bits. The digitized lever stroke data are fetched in the parallel form or the serial form by time division by a CPU (central processing unit) 100, through an input interface 101.

Figure 4:
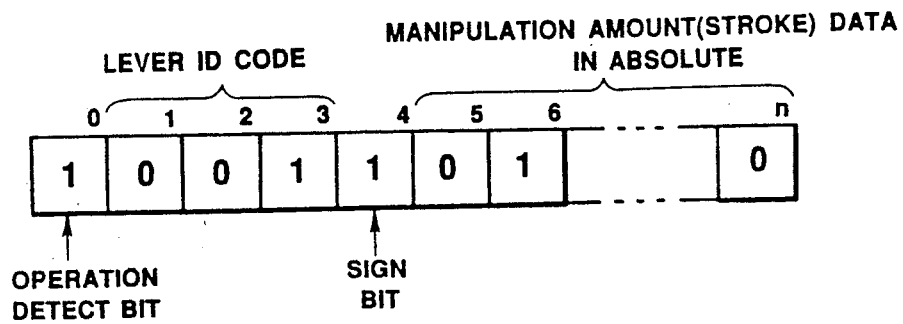
FIG. 4 shows a data format of the lever operation data used in, the embodiment.

In the input interface 101, when the CPU 100 fetches the lever stroke data, the information concerning the lever operations (referred to as lever operation data) is rearranged into a data format as shown in FIG. 4, for example, in order that the stroke data are properly and exactly transferred to the CPU 100.

In the instance of FIG. 4, each lever operation data consists of (n+1) bits, 0th to n-th. Of those bits, the 0th bit is a lever operation detect bit to indicate if the lever is operated or not. The 1st to 3rd bits make up an identification code to identify the lever used. The 4th bit is a sign bit to indicate the direction of the lever operation, positive or negative. The remaining bits, 5th to n-th bits, the stroke data of lever manipulation (in this instance, it is expressed as an absolute value with reference to a neutral position of lever at least at the time point of the data formatting). The operation detect bit indicates if the lever under operation starts from the neutral position and reaches an actual operation region beyond an approach region (insensitive region as an idle region). In other words, it indicates if the stroke data of to a boundary between the approach region and the actual operation region. This is expressed by a logic level "1" or 20". The lever identification code of a 3-bit length identifies any of the six operating levers 11 to 16 to which the operation detect bit and the stroke data belong. 6 different codes have been assigned as lever identification codes to those levers 11 to 16.

The data of the selected modes from the work accuracy mode select switch 21 and the priority mode select switch 22 are applied to the CPU 100, via another input interface 102.

Figure 5:
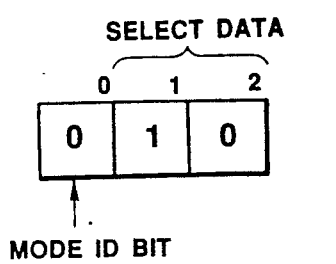
FIG. 5 shows a data format of the work accuracy mode select data.
Figure 6:
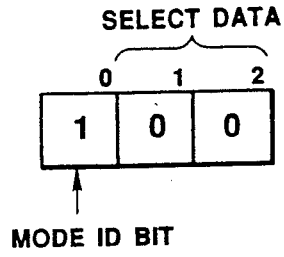
FIG. 6 shows a data format of the priority mode select data.

The input interface 102 receives the selected mode data from these switches 21 and 22, and rearranges the data into data formats as shown in FIGS. 5 and 6.

In this instance, the data format of FIG. 5 is used for the select mode data from the work accuracy mode select switch 21. As shown, the data format consists of three bits, 0th to 2nd bits, with the top bit (0th bit) of logical "0". Combinations of the remaining 2 bits (1st and 2nd bits) represent the selected modes (switch-selected modes). The data format of FIG. 6 is used for the select mode data from the priority mode select switch 22. As shown, the data format consists of three bits, 0th to 2nd bits, with the top bit (0th bit) of logical "1". Combinations of the remaining 2 bits (1st and 2nd bits) represent the selected modes (switch-selected modes).

As the result of the processings by the input interfaces 101 and 102, the CPU 100 may exactly recognize the various types of information of the operated levers 11 to 16 (operation or nonoperation of the levers, which lever is operated, the direction of lever manipulation and manipulated amount), and the selected modes as selected by the switches 21 and 22.

First to fourth memories 41 to 44 connected to the CPU 100 are, for example, read only memories (ROMs) storing various control data for the operation controls by the operation control device.

Description to follow is elaboration of the information stored in these memories, how to read out the information from those memories, and how the CPU 100 processes the read out information.

Figure 7:
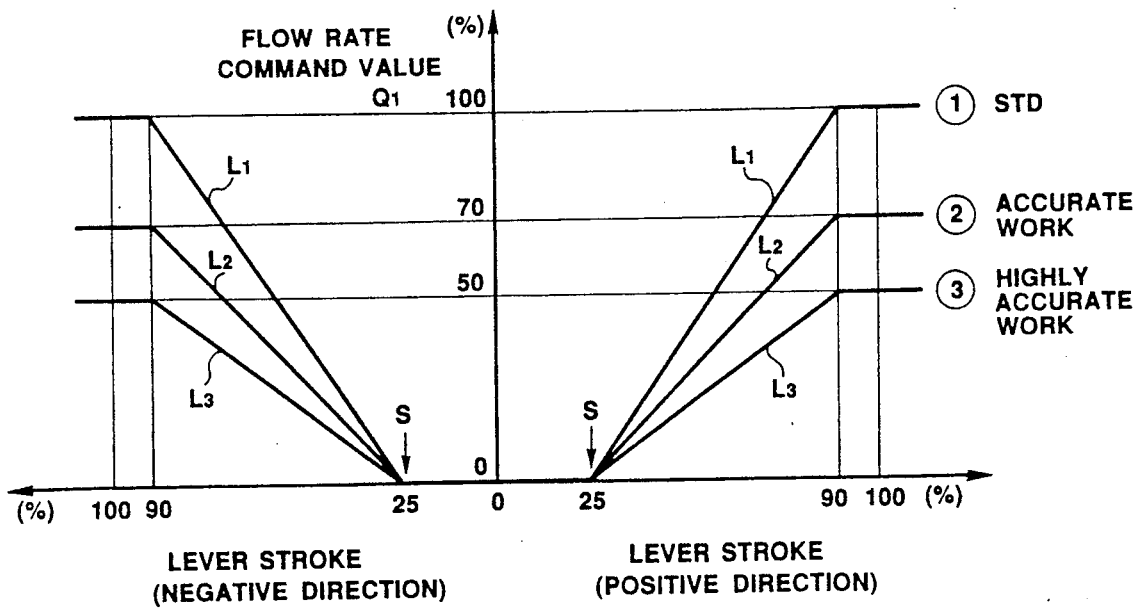
FIG. 7 shows a graph showing characteristic curves defining the data stored in a first memory used in the embodiment of FIG. 1.

The first memory 41 stores a table of flow rate command values representing the characteristics as shown in FIG. 7. As shown, these flow rate command values are defined by the work accuracy modes selected by the work accuracy select switch 21 (referred to as selected work accuracy mode data) and the stroke data (manipulated amount data) derived from the levers 11 to 16. These flow rate command values are applied to the related actuators and motors.

When of the work accuracy modes, the STD (standard) mode (1) is selected, the CPU 100 recognizes selection of the STD mode (and transfers the data about the selected mode to the first memory 41). Under this condition, the stroke data derived from any of the levers 11 to 16 are also applied through the CPU 100 to the first memory 41. When receiving both the data of STD mode and stroke, the first memory 41 specifies a flow rate command value Q1 as defined by both the data according to a characteristic curve L1 in FIG. 7. The CPU 100 reads out the specified command value Q1 and fetches it. When the accurate mode (2) or the highly accurate mode (3) is selected, the CPU 100 recognizes selection of either of the work accuracy modes (and transfers the data about the selected mode to the first memory 41). Under this condition, the stroke data derived from any of the levers 11 to 16 are also applied through the CPU 100 to the first memory 41. When receiving both the data of selected mode and stroke, the first memory 41 specifies a flow rate command value Q1 as defined by both the data according to a characteristic rectilinear curve L2 or L3 in FIG. 7. The CPU 100 reads out the specified command value Q1 and fetches it.

Ratios of the manipulated amounts from the levers 11 to 16 and the flow rate command values Q1 generated (read out from the first memory 41) under control of the CPU 100 in response to the manipulated amounts may be selected in three levels according to the three work accuracy modes as specified by the work accuracy mode select switch 21.

In FIG. 7, break denoted as "S" ("25%" lever stroke point in this instance) indicates a boundary between the approach region and the actual operation region of each lever. When the lever stroke exceeds this boundary, the input interface 101 sets the operation detect bit of the lever operation data of the related lever (FIG. 4) at logic level "1", and informs the CPU 100 that the lever stroke exceeds the boundary.

The second memory 42 stores a table of weighting coefficients, which are applied to the flow rate command values Q1 (FIG. 7) as specified by each equal manipulated amount, according to the priority mode selected by the priority mode select switch 22 (referred to as selected priority mode data). The weight coefficient table is as shown in Table 1, for example.

TABLE 1

|  | priority mode | | | | |
| --- | --- | --- | --- | --- | --- |
|  |  | ② boom top | arm top priority ③ | | revolution top priority |
| operation | ① STD | priority | digging | dumping | ④ |
| boom |  |  |  |  |  |
| up | $a_1$ | $a_2$ | $a_{31}$ | $a_{32}$ | $a_4$ |
| down | $b_1$ | $b_2$ | $b_{31}$ | $b_{32}$ | $b_4$ |
| arm |  |  |  |  |  |
| digging | $c_1$ | $c_2$ | $c_{31}$ | $c_{32}$ | $c_4$ |
| dumping | $d_1$ | $d_2$ | $d_{31}$ | $d_{32}$ | $d_4$ |
| bucket |  |  |  |  |  |
| digging | $e_1$ | $e_2$ | $e_{31}$ | $e_{32}$ | $e_4$ |
| dumping | $f_1$ | $f_2$ | $f_{31}$ | $f_{32}$ | $f_4$ |
| revolution | $g_1$ | $g_2$ | $g_{31}$ | $g_{32}$ | $g_4$ |
| traveling |  |  |  |  |  |
| left | $h_1$ | $h_2$ | $h_{31}$ | $h_{32}$ | $h_4$ |
| right | $i_1$ | $i_2$ | $i_{31}$ | $i_{32}$ | $i_4$ |

In the above table
(a1, c1)>(d1, e1, f1)>(b1, g1, h1, i1) (s2, b2)>(c2, d2, e2, f2, g2, h2, i2) (c31, d31)>(a31, b31, c31, d31, e31, f31, g31, h31, i31) (c32, d32)>(a32, b32, c32, d32, e32, f32, g32, h32, i32) (g4>(a4, b4, c4, d4, e4, f4, h4, i4).

The coefficients a1 to i1, a2 to i2, a3 to i3 (a31 to i31, a32 to i32), and a4 to i4 in Table 1 may be set to appropriate values according to the magnitude (weight) relationships as referred to in footnote for Table 1, in connection with the flow rate command value Q1=100%, for example, in those priority modes, (1) STD mode, (2) boom priority mode, (3) arm priority mode, and (4) revolution priority mode. (For example, for a2, b2=1, c2 to i2=0, 5. Within a range where the weight coefficient is satisfied, the following relationships may hold: a2=b2, c2 =d2=e2=f2=g2=h2==i2.) The CPU 100 reads out the corresponding coefficients of those stored in the second memory 42 the lever operation data (in the multi-operation, in this instance) the selected priority mode data, which are applied through the input interfaces 101 and 102. The CPU 100 further calculates the allocation of each of the read out coefficients for the flow rate command value Q1 as read out from the first memory 41. Finally, it produces a flow rate command value Q2 as the command value Q2 appropriately weighted.

To be more specific, let us consider a case that the selected priority mode select data represents the boom priority mode, the lever operation data is representative of; up operation for the boom lever is present,
  operation to the digging side for the arm lever is present,
  and
  the flow rate command value Q1 in a selected working accuracy mode is
  100% for the boom lever, and
  50% for the arm lever.
In this case, the CPU 100 reads out the weighting coefficients a2 and c2 (a2>c2) corresponding to the above operation data from the second memory 42. For each flow rate command value Q1, the CPU 100 executes the following calculations $$a2 \times 1 = a2 \tag{1}$$

$$c2 \times (1/2) = c2/2 \tag{2}$$

For the boom, the following equation (3) is worked out by the CPU 100

$$a2/\{(a2+(c2/2)\} = Q_{2BM} \tag{3}$$

For the arm, an equation (4) is worked out $$(c2/2)\{a2+(c2/2)\} = Q_{2AM} \tag{4}$$

In this way, for each flow rate command value Q1, another flow rate command value Q2($Q_{2BM}$, $Q_{2AM}$) thus weighted is obtained.

Through the above interaction between the CPU 100 and the second memory 42, even if the levers 11 to 16 are operated by the same manipulated amounts, the operation control device may obtain the flow rate command values Q2 appropriately weighted (for the related actuators) according to the selected priority mode data.

The third and fourth memories 43 and 44 are respectively used for storing the utilization data and the swash plate data of two variable oil supply pumps, a front pump FP and a rear pump RP, which are driven in tandem by an engine EG in FIG. 1.

The third memory 43 stores the utilization data as shown in Tables 2-1 to 2-4. The utilization data describes which of the front pump FP and the rear pump RP is first operated for pressure oil supply to the actuators.

TABLE 2-1

|  | pump | |
| --- | --- | --- |
| operation | front pump FP | rear pump RP |
| left traveling | — | $Q_{LD \cdot R}$ |
| right traveling | $Q_{RD \cdot F}$ | — |

TABLE 2-2

|  | pump | | | |
| --- | --- | --- | --- | --- |
|  | front pump | | rear pump | |
| operation | FP | priority | RP | priority |
| revolution | — | low ↑ high | $Q_{TN \cdot R}$ | high ↓ low |
| arm | ($Q_{AM \cdot F}$) |  | $Q_{AM \cdot R}$ |  |
| bucket | ($Q_{BK \cdot F}$) |  | $Q_{BK \cdot R}$ |  |
| boom | ($Q_{BM \cdot F}$) |  | $Q_{BM \cdot R}$ |  |
| left traveling | $Q_{LD \cdot F}$ |  | ($Q_{LD \cdot R}$) |  |
| right | $Q_{RD \cdot F}$ |  | — |  |

TABLE 2-2-continued

| operation | pump | | | |
|---|---|---|---|---|
| | front pump FP | priority | rear pump RP | priority |
| traveling | | | | |

(Note) Parenthesized values indicate flow rates of the combined flows.

TABLE 2-3

| operation | pump | |
|---|---|---|
| | front pump FP | rear pump RP |
| revolution | — | $Q_{TN \cdot R}$ |
| arm | $Q_{AM \cdot F}$ | $(Q_{AM \cdot R})$ |

TABLE 2-4

| operation | pump | | | |
|---|---|---|---|---|
| | front pump FP | priority | rear pump RP | priority |
| revolution | — | low ↑ high | $Q_{TN \cdot R}$ | high ↓ low |
| arm | $(Q_{AM \cdot F})$ | | $Q_{AM \cdot R}$ | |
| bucket | $Q_{BK \cdot F}$ | | $(Q_{BK \cdot R})$ | |
| boom | $Q_{BM \cdot F}$ | | $(Q_{BM \cdot R})$ | |

(Note) Parenthesized values indicate the flow rates of the combined flows.

Table 2-1, which relates to the lever operation data of only the traveling levers 14 and 16, is stored in a memory area of the third memory as specified through the CPU 100. Table 2-1 describes the utilization data of the two pumps for the traveling levers 14 and 15 alone. As seen from the table, in response to the operation data as applied from the CPU 100, the third memory 43 produces the data to the effect that only the rear pump RP is utilized for the left travelling motor LDM, and only the front pump FR for the right travelling motor RDM.

Table 2—2, which relates to the multi-operation of the actuators including the travelling actuators, is stored in another memory area of the third memory as specified through the CPU 100. Table 2—2 describes the utilization data of the two pumps. As seen from the table, when this area is specified, in response to the operation data as applied from the CPU 100, the third memory 43 produces the data for transfer to the CPU 100 to the effect that the front pump FR and the rear pump RP will be used in relation with the listed actuators in the priority orders as shown.

For example, in case that the lever operation data is the multi-operation of the left travelling lever 14 and the boom lever 11, the third memory 43 produces the data of the following meanings for transfer to the CPU 100. The left travelling motor LDM is supplied with the pressure oil from the front pump FP. The rear pump RP supplementarily supplies the pressure oil to the motor LDM for satisfying its flow rate command value Q2. The boom cylinder BMS, is supplied with the pressure oil from the rear pump RP. The front pump FP supplementarily supplies the pressure oil to the cylinder BMS for satisfying its flow rate command value Q2. For the other multi-operations including the traveling, the utilization data of the two pumps will be read out from the CPU 100 according to the table.

Table 2-3, which relates to the lever operation data of only the revolution and arm levers 16 and 12, is stored in yet another memory area of the third memory as specified through the CPU 100. Table 2-3 describes the utilization data of the two pumps for the revolution and arm levers 16 and 12. As seen from the table, in response to the operation data as applied from the CPU 100, the third memory 43 produces the data for transfer to the CPU 100 to the effect that only the rear pump RP is utilized for the revolution motor TNM, and for the arm cylinder AMS, the front pump FP is mainly used and the rear pump RP is supplementarily used for satisfying its flow rate command value Q2.

Table 2-4, which relates to the multi-operation of the actuators not including the travelling actuators, is stored in a further memory area of the third memory as specified through the CPU 100. Table 2-4 describes the utilization data of the two pumps. As seen from the table, when this area is specified, in response to the operation data as applied from the CPU 100, the third memory 43 produces the data for transfer to the CPU 100 to the effect that the front and rear pumps FP and RP will be used in relation with the listed actuators in the priority orders as shown.

In the above tables, Tables 2-1 through 2-4, the suffixes to "Q" indicate the actuators and pumps of the flow rate command values, respectively. For example, "$Q_{AM \cdot F}$" indicates a flow rate command value of "a flow rate supplied from the front pump FP to the arm cylinder AMS".

The fourth memory 44 stores tables of the data of FIG. 8 describing the swash plate command values (flow rate allocations) for the flow rate command values Q2 for the two pumps FP and RP whose utilization (priority) data are stored in the third memory 43.

Figure 8A:
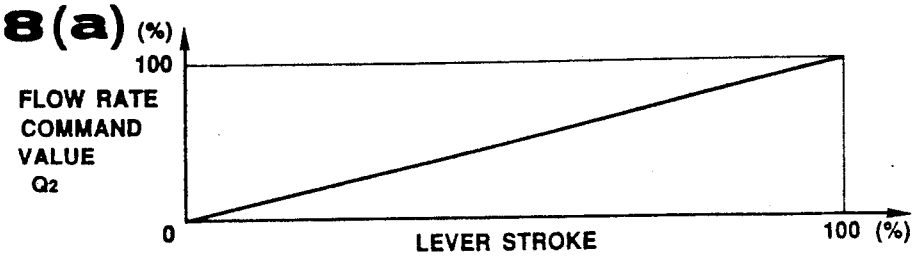
FIGS. 8a–8c shown characteristic curves defining the data stored in a fourth memory used in the embodiment of FIG. 1.
Figure 8B:
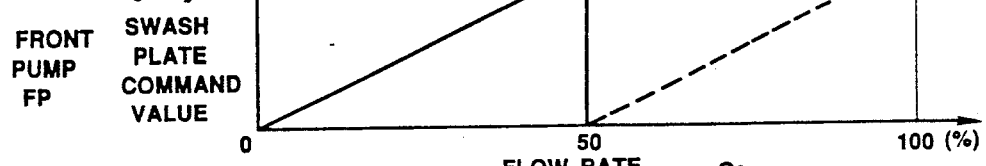
Figure 8C:
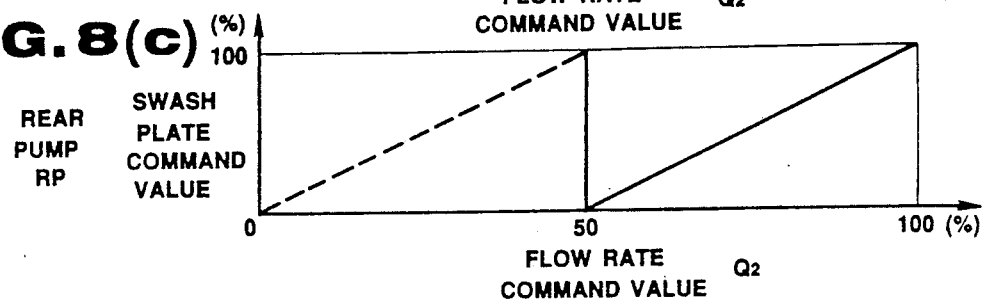
Figure 9A:
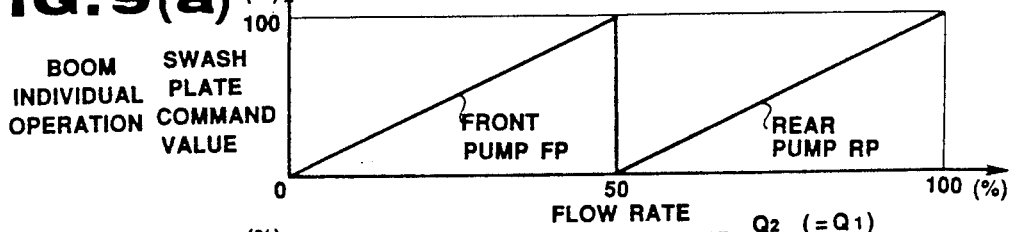
Figure 9B:
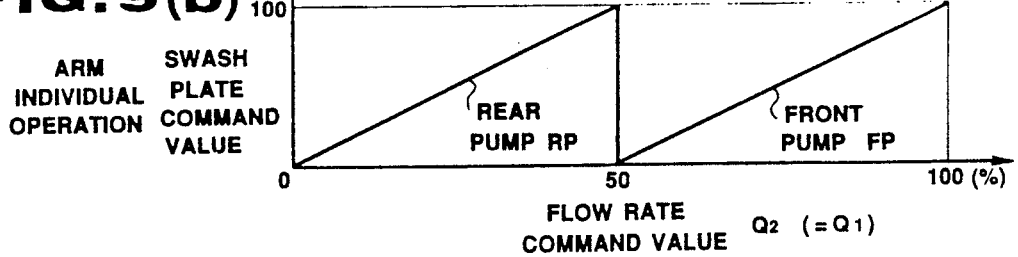

The fourth memory 43 stores the swash plate command values for the front pump FP and the rear pump RP against the flow rate command values Q2, as shown in FIGS. 8(b) and 8(c). The command values Q2 (which are weighted and their ratios to the strokes are changed according to the selected work accuracy mode data and the selected priority mode data) are defined by the lever strokes of the levers 11 to 16, as shown in FIG. 8(a). In the fourth memory 43, the characteristics of solid line and broken line shown in FIGS. 8(b) and 8(c) are switched from one to the other and vice versa on the basis of the utilization data (priority of these pumps, and the swash plate command value is specified by a designated flow rate command value Q2, and is out for the CPU.

When the arm is solely operated, the swash plate command values are specified so that according to the utilization data shown in Table 2-4, the pressure oil supplied to the arm cylinder AMS is first fed from only the front pump FP, and a shortage of the flow rate command value Q2 (in the individual operation, it is assumed that Q2=Q1), viz., the value exceeding Q2=50%) is fed from the rear pump RP. See FIG. 9(a). When the boom is solely operated, the swash plate command values are specified so that according to the utilization data shown in Table 2-4, the pressure oil supplied to the arm cylinder AMS is first fed from only the rear pump RP, and a shortage of the flow rate command value Q2 (=Q1), viz., the value exceeding Q2=50%) is fed from the front pump FP. See FIG. 9(b). When the multi-operation of the boom and the arm is operated swash plate command values are specified so that according to the utilization data shown in Table 2-4, the pressure oil is simultaneously fed from both the rear pump RP and the front pump FP, and that the boom cylinder is preferentially fed with the pressure oil at the flow rate amounting to the flow rate command value Q2 ($Q_{2BM}$), from the front pump FP, the arm cylinder AMS is preferentially fed with the pressure oil at the flow rate amounting to the flow rate command value Q2 ($Q_{2AM}$), from the rear pump RP.

Thus, provision and functions of the third and fourth memories 43 and 44 including the CPU 100 make the multi-operation in the construction machine remarkably easy and reliable.

As seen from the foregoing description, cooperation of the CPU 100, and the first to fourth memories 41 to 44 determines the flow rate command values Q2 for the respective actuators, and the swash plate command values for the two pumps, the front and rear pumps. The flow rate command values Q2 finally selected are divided into the front pump FP and the rear pump RP. Subsequently, the command values Q2 for the front pump FP will be denoted as Q2F, while those Q2 for the rear pump RP as Q2RP, for simplicity. Those finally selected flow rate command values may be arranged as shown in Table 3, in connection with Tables 2-1 to 2-4.

TABLE 3

| Actuator | Pump | |
|---|---|---|
| | Front pump FP | Rear pump RP |
| Boom cylinder BMS | $Q_{2BM}$ F | $Q_{2BM}$ R |
| Arm cylinder AMS | $Q_{2AM}$ F | $Q_{2AM}$ R |
| Bucket cylinder BKS | $Q_{2BK}$ F | $Q_{2BK}$ R |
| Left travelling motor | $Q_{2LD}$ F | $Q_{2LD}$ R |
| Right travelling motor | $Q_{2RD}$ F | $Q_{2RD}$ R |
| Revolving motor | — | $Q_{2TN}$ R |

An output interface 103 in FIG. 1 transfers the final flow rate command values $Q_{2F}$ and $Q_{2R}$ for the respective actuators as determined by the CPU 100, to valve drivers 51 to 56. Another output interface 103 likewise transfers the swash plate command values for the two pumps FP and RP to servo-valve drivers 61 and 62. In those drivers 51 to 56 supplied with the command values $Q_{2F}$ and $2_R$ from the output interface 103, those command values $Q_{2F}$ and $2_R$ (more exactly, the command values for the respective actuators shown in Table 3 and including the operation direction data expressed by the sign bit in the lever operation data) are converted into electrical signals amounting to those command values. These electrical signals are applied to the electromagnetic valves of the six valves 71 to 76 as the pressure oil flow rate control valves for the respective actuators. In the drivers 61 and 62 applied with the swash plate command values from the output interface 104, the command values are converted into corresponding electrical signals. The electrical signals are respectively applied to servo valves 81 and 82 as the swash plate control valves for the front pump FP and the rear pump RP. Actually, a third pump (not shown) is provided in addition to these pumps FP and RP. The swash plate angles of both the pumps FP and RP are adjusted through the control of the flow rates of the pressure oil from the third pump by the servo valves 81 and 82.

Specific arrangements of the valves 71 to 76 are illustrated in FIG. 10.

Figure 10A:
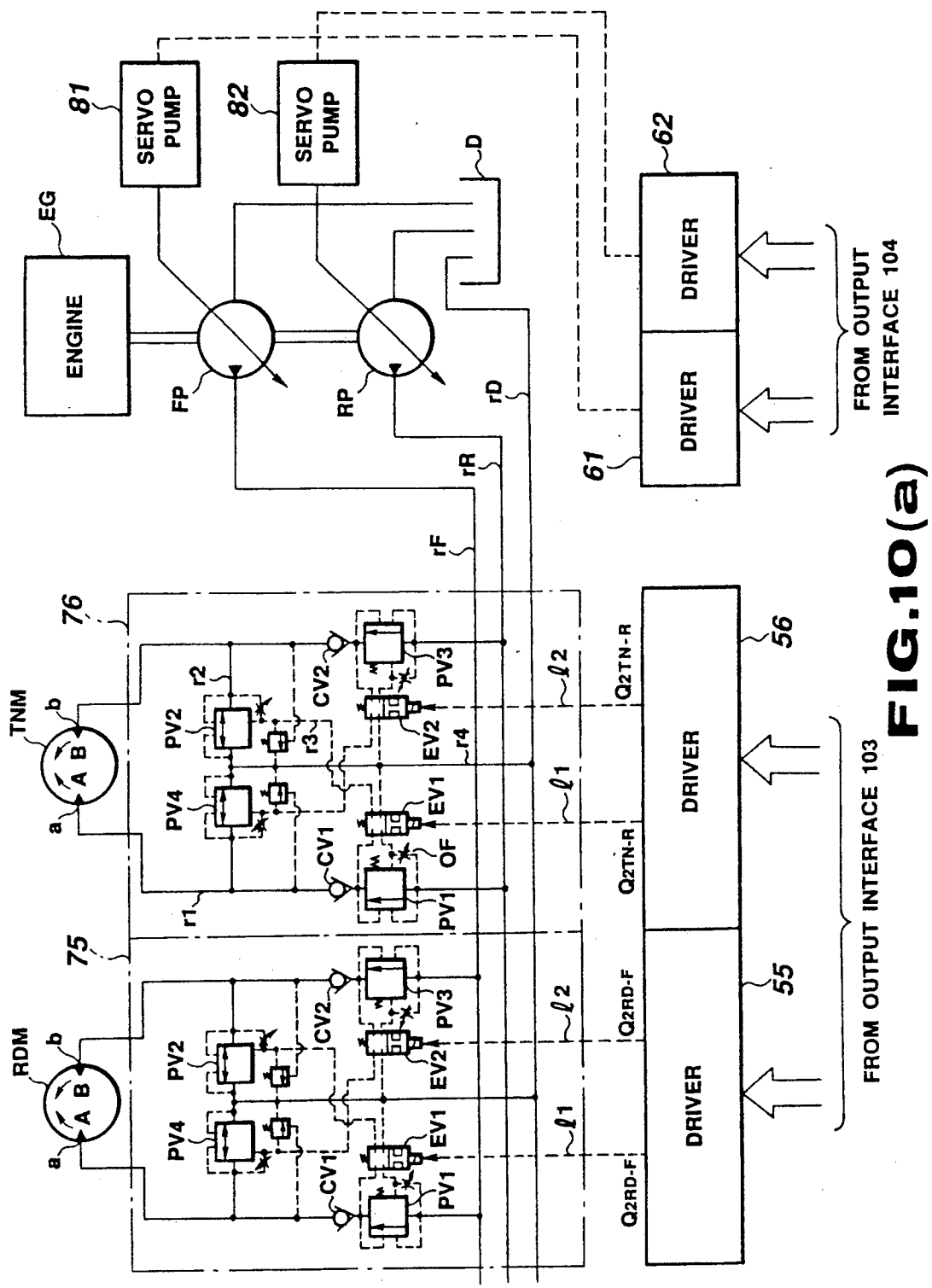
Figure 10B:
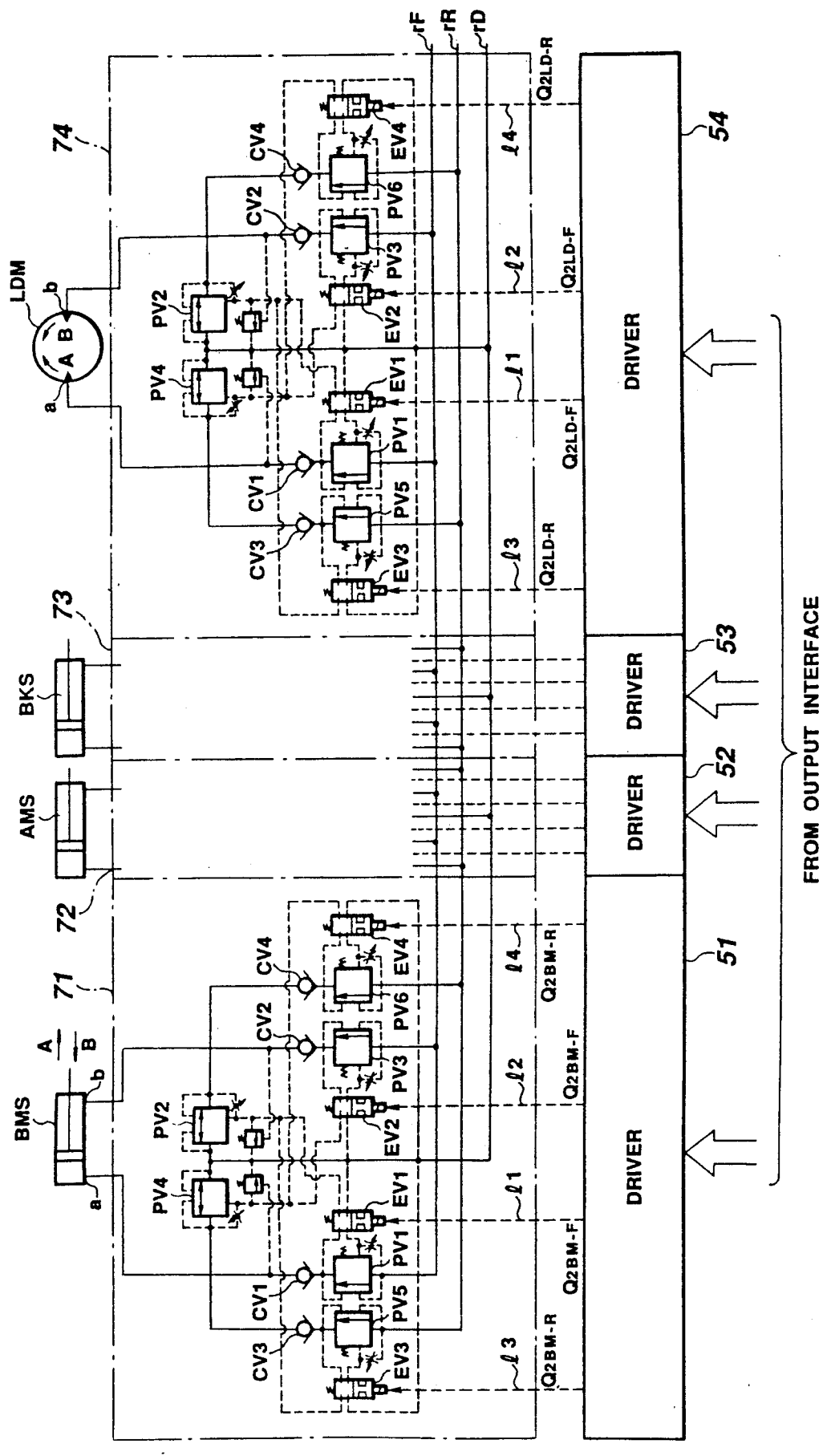

These valves 71 to 76 have the same basic arrangements, as shown in FIGS. 10(a) and 10(b). The flow rate control valve 76 for the pressure oil supplied to the revolution motor TNM shown in FIG. 10(a), for example, controls a flow rate of the pressure oil in the following way.

In this instance, poppet valves PV1 to PV4 are used for the flow rate control valve. An electromagnetic valve V1 controls the poppet valves PV1 and PV2. Through this control, the flow rate of the pressure oil to drive the actuator (revolution motor TNM) in the direction of arrow A is controlled. An electromagnetic valve V2 controls the poppet valves PV3 and PV4. Through this control, the flow rate of the pressure oil to drive that actuator in the direction of arrow B is controlled.

The supply of the pressure oil at a commanded flow rate to drive (turn) the revolution motor TNM in the direction of arrow A, will be described.

The driver 56 applies a valve flow rate command value $Q_{2TN,R}$ to the solenoid of the electromagnetic valve EV1, through a signal line 11. The valve EV1 moves its spool according to the valve flow rate command value $Q_{2TN,R}$ applied to the valve.

The oil pressure depending on an orifice OF and a spool position of the electromagnetic valve EV1 is applied to the poppet valve PV1. The poppet valve PV1 applies the pressure oil at the flow rate based on the oil pressure, viz., the command flow rate, to the port "a" of the motor TNM, via a check valve CV1 and an oil path r1.

As the result of the supply of the pressure oil to the port "a" of this motor TNM, the oil pressure in the oil path r2 connecting to another port "b" of the motor TNM rises. Since an oil path r3 is connected to an oil path r4 by way of the electromagnetic valve EV1, the oil pressure in the oil path r3 drops and subsequently the poppet valve PV2 opens. Finally, the pressure oil in the port "b" of the motor TNM flows into a drain D, through a route including the poppet valve PV2, oil path r4 and oil path rD.

In this way, the magnetic valve VEl controls the poppet valves PV1 and PV2. The oil at the flow rate, which is specified by the valve flow rate command value $Q_{2TN,R}$ applied to the solenoid of the electromagnetic valve EV1, is applied to the motor TNM, to drive (turn) it in the direction of arrow A. To feed the pressure oil to the motor TNM and to drive (turn) it in the direction of arrow B, the poppet valves PV3 and PV4 are controlled by the electromagnetic valve FV3 connecting to the signal line 12. These valves are arranged symmetrically with the electromagnetic valve EV1 and the poppet valves PV1 and PV2. The operation of them is substantially the same as that of the latter valve group.

The revolution motor TNM is fed with the pressure oil only from the rear pump RP, as referred to in the description of the third memory 43. Therefore, the pressure oil flow rate control valve 76 is so arranged as to receive the pressure oil fed through an oil path rR connecting to the rear pump RP. The pressure oil flow rate control valve 75 for the right travelling or drive motor RDM fed only from the front pump FP has substantially the same arrangement as that of the valve 76. Therefore, the valve 75 is supplied with the pressure oil through an oil path rF connecting to the front pump FP.

The pressure oil flow rate control valves 71 to 74 will be described, which are coupled with the boom cylinder BMS, arm cylinder AMS, bucket cylinder BKS, and left travelling or drive motor LDM, which are fed with the pressure oil from both the right and left drive motors RDM and LDM at the priority different from that of the flow rate control valves 75 and 76. Each of those flow rate control valves 71 to 74 basically consists of two poppet valve systems, one system. made up of poppet valves PV1 and PV3 connecting to the oil path rF and the other system made up of poppet valves PV5 and PV6 connecting to the oil path rR. When the pressure oil is fed from the front pump FP to the related actuator to drive it in the direction of arrow A, for example, the electromagnetic valve EV1 connecting to a signal line 11 controls the poppet valves PV1 and PV2. When the pressure oil is fed from the rear pump RP, the electromagnetic valve EV3 connecting to a signal line 13 controls the poppet valves PV5 and PV2. The basic flow rate control operation of each valve 71 to 74 is similar to that of the valve 76.

An operation of the overall operation control device of the present embodiment will be described referring to FIGS. 11 and 10 showing flow charts charting sequences of signal processings by the CPU 100 in the operation control device.

To start with, an operator starts up the engine EG. He operates the work accuracy mode select switch 21 and the priority mode select switch 22, and selects a desired work accuracy mode and a priority mode. As shown, if at least one of the levers 11 to 16 is operated by the operator, in other words, if one of those pieces of the lever operation data (FIG. 4) applied from the input interface 101 contains logic "1" in the operation detect bit, the CPU 100 fetches the selected work accuracy select data (FIG. 5) and the selected priority mode select data (FIG. 6). Then, it selects a related routine of those routines A to L, and executes the selected routine. The details of these routines A to L are illustrated in FIG. 12.

In executing these routines A to L, the CPU 100 receives the lever identification code of the currently operated lever, i.e., the lever whose operation detect bit is "1" in the lever operation data (FIG. 4), and checks if the operated lever (including a plurality of levers) contains the traveling lever 14 or 15.

As the result of the check, when the lever identification code indicates only the travelling lever 14 or 15 (including another multi-operated lever), the CPU 100 executes the related routine according to the flow of "a" in FIG. 12. When the lever identification code indicates the travelling lever 14 or 15 and another multi-operated lever, the CPU 100 executes the routine according to the flow of "b" in FIG. 12. When it indicates the multi-operation by only the revolution lever and the arm lever 12, not including the travelling levers, the related routine is executed according to the flow of "c" in FIG. 12. When the identification code indicates an individual operation by any of the remaining lever or the multi-operation of these levers (not including the travelling lever, and other levers than the revolution lever 16 and the arm lever 12), the related routine is executed according to the flow of "d" shown in FIG. 12.

The control flow "a" by the CPU 100 will be described. After the CPU 100 decides on the basis of the lever identification code that the operated lever includes only the travelling levers 14 and 15, the CPU 100 executes the processings in the following order.

(1) To recognize the stroke data from each lever operation data.

(2) To specify the table based on the characteristic curve of the selected work accuracy mode data (FIG. 7) in the first memory 41, and to read out the flow rate command value Q1 as specified by the stroke data. In other words, the CPU calculates the following formula in the work accuracy mode selected by the operator.

[lever stroke/flow rate command value Q1]

(3) To read out of the second memory 42, the details of that operation (either of the left travelling or the right travelling, in this instance) and the weighting coefficients (Table 1) based on the selected priority mode data, and executes the weighting operations as given by the relations (1) to (4). In other words, the CPU executes the following formula in the priority mode as selected by the operator

[flow rate command value Q1/flow command value Q2]

In case that the lever operation is the individual operation by the left travelling operation 14 or the right travelling lever 15, the CPU calculates the flow rate command value Q2 with Q2=Q1.

(4) To read out the pump utilization data shown in Table 2-1 from the third memory 43, and decides the utilization of the front pump FP and rear pump RP, and further read out from the fourth memory 44 (FIG. 8), the flow rate command values $Q_{2LD.R}$ and $Q_{2R}$ D.F for the valves 76 and 75, which are specified by the pump utilization and the calculated flow rate command value Q2, and further the swash plate command values for the front pump FP and rear pump RP. In other words, the CPU executes the following formula based on the details of the lever operation by the operator.

[flow rate command value Q2/(valve flow rate command value $Q_{2F}$ and $Q_{2R}$ ×swash plate command value of each pump)]

(5) Valve flow rate command value $Q_{2F}$ and $Q_{2R}$ thus calculated ($Q_{2LD.R}$ and $Q_{2R}$ D.F in this instance), together with the sign bits of the corresponding lever operation data, are output to the related driver (drivers 54 and 55, in this instance), via the output interface 103. The swash plate command values of the pumps are output through the output interface 104 to the drivers 61 and 62.

As the result of the above sequence of the processings, the front pump FP and the rear pump RP start to supply the pressure oil at the specified flow rate, with the swash plate angles based on the swash plate command values. The valve 74 and 74 execute the flow rate control according to the specified data $Q_{2LD.R}$ and $Q_{2R}$ D.F (including the direction data by the sign bit), and controls the drive direction and the drive amount of the related actuators (the left travelling motor LDM and the right travelling motor RDM, in this instance).

After the calculation in the above step (4), the CPU 100 returns to the first step (step for checking if the lever operation is present, in FIG. 11), and repeats the above sequence of operations. In this way, the operation control device may follow up the lever operation by an operator.

The above processing flow by the CPU 100 may be correspondingly applied to the flows "b", "c" and "d", except for the step (4). In the step (4), the different memory areas of the third memory 43 are used as shown in FIG. 12.

Even in the multi-operation in which of the operation levers 11 to 16, some of them are combined and simultaneously operated, the operation control device according to the present embodiment may automatically give priorities to the drives of the actuators as the driven objects, according to the priority as selected by the priority mode select switch 22. Therefore, the operation of the multi-operation is remarkably improved. An operator may select the drive accuracy of each actuator by the work accuracy select switch 21, according to a desired work accuracy. This is allowed irrespective of the type of the operation, the multi-operation and the individual operation. This remarkably reduces the operator's load for the work accuracy. Two separate pumps are used for the drive source for the actuators. The pressure oil is distributed to them at given proportions and at a predetermined priority order for each combination of the actuators for the multi-operation. This improves the operability in the multi-operation. When the STD mode (1) is selected for the priority mode in the multi-operation, the pressure oil is distributed to the actuators by the two separate pumps at the proportions as shown in FIG. 13.

The operation control device as mentioned above is equipped with all the functions, the work accuracy select function in connection with the first memory 41, the priority mode select function in connection with the second memory 42, and the two-separate-pumps control function in connection with the third and fourth memories 43 and 44. It is evident that the operation control device with one of those functions is operable solving the disadvantages of the prior art.

It should be understood that the arrangement of the operation control device as mentioned above is merely one of the preferred modes of the present invention, and hence any other arrangement is available for this invention, if it is cable of executing the same or equivalent function as those of the above-mentioned embodiment. Further, the numbers of the operation modes and those components making up the arrangement, such as actuators, pumps as the oil pressure source, work accuracy mode select switch, priority mode select switch, and work accuracy mode and priority mode, may be suitablly selected. The object to which the present invention is applied may be any other suitable machines than the power shovel. The actuators, which are of the oil pressure driven type in the above-mentioned embodiment, may be of the other suitable drive type, for example, the electric driven type.

Industrial Applicability

As seen from the foregoing, the operation control device according to the present invention remarkably improves the operability of the construction machine incorporating the control device, and may easily make desired operations of a plurality of actuators as the operated objects by any operator, skilled and unskilled, in any operation mode, the individual operation and in the multi-operation.

We claim:
1. An operation control device comprising:
a plurality of actuators;
a plurality of operating means for outputting respective drive command values for each of said plurality of actuators;
a plurality of pressure oil supply means for supplying pressurized oil to each actuator at flow rates each corresponding to each of the drive command values outputted from said plurality of operating means;
at least two pressure oil sources for transferring to each pressure oil supply means via at least two paths the pressurized oil which is supplied to each actuator;
control means for controlling each pressure oil supply means so that the pressurized oil transferred from each of said pressure oil sources are respectively distributed to each actuator with respective flow rates according to priority orders of each of the actuators predetermined respectively for each of said at least two pressure oil sources;
operation mode selecting means for selecting an operation mode from among a plurality of operation modes indicative of respective ratios; and
means for setting a ratio of a drive command value for a manipulated amount of said operating means into a ratio selected by said operation mode selecting means.

2. An operation control device comprising:
a plurality of actuators;
a plurality of operating means for outputting respective drive command values for each of said plurality of actuators;
a plurality of pressure oil supply means for supplying pressurized oil to each actuator at flow rates each corresponding to each of the drive command values outputted from said plurality of operating means;
at least two pressure oil sources for transferring to each pressure oil supply means via at least two paths the pressurized oil which is supplied to each actuator;
control means for controlling each pressure oil supply means so that the pressurized oil transferred from each of said pressure oil sources are respectively distributed to each actuator with respective flow rates according to priority orders of each of the actuators predetermined respectively for each of said at least two pressure oil sources;
priority mode selecting means for selecting a weighting factor of each actuator set with respect to one priority mode from among weighting factors of respective actuators set for a plurality of priority modes; and
means for respectively multiplying the weighting factor of each actuator selected by said priority mode selecting means by the drive command value of each actuator output from said operating means, and changing the drive command value of each actuator.

* * * * *